United States Patent [19]

Huang et al.

[11] Patent Number: 4,466,738

[45] Date of Patent: Aug. 21, 1984

[54] VIBRATION SENSOR

[75] Inventors: Cheng-Chung Huang; Tao Chang, both of Sunnyvale, Calif.

[73] Assignee: Lockheed Missiles & Space Co., Sunnyvale, Calif.

[21] Appl. No.: 410,515

[22] Filed: Aug. 23, 1982

[51] Int. Cl.³ .............................................. G01B 9/02
[52] U.S. Cl. ..................................... 356/4.5; 73/657; 356/28.5; 356/349
[58] Field of Search ....................... 356/4.5, 349, 28.5; 73/657

[56] References Cited

U.S. PATENT DOCUMENTS 4,263,002  4/1981  Sathyakumar ...................... 356/349

OTHER PUBLICATIONS

Kristal et al., "Bragg Cell Heterodyne Interferometry of Fast Plasma Events", *Rev. Sci. Instrum.*, vol. 47, No. 11, pp. 1357–1359, 11/76.

Primary Examiner—William L. Sikes
Assistant Examiner—Matthew W. Koren
Attorney, Agent, or Firm—H. Donald Volk

[57] ABSTRACT

The disclosed heterodyne measurement apparatus utilizes a single coherent light source to simultaneously measure the location of a number of points on a surface. The coherent light is split into two parts by a Bragg Cell. One part, after being spatially split into a plurality of beams by a second Bragg Cell, fed to a plurality of reflectors on the surface, and recombined by the second Bragg Cell, is heterodyned with the second part. The heterodyned signal is fed to a photodetector and further processed to produce a signal representative to the distance to the points of interest on the surface.

6 Claims, 1 Drawing Figure

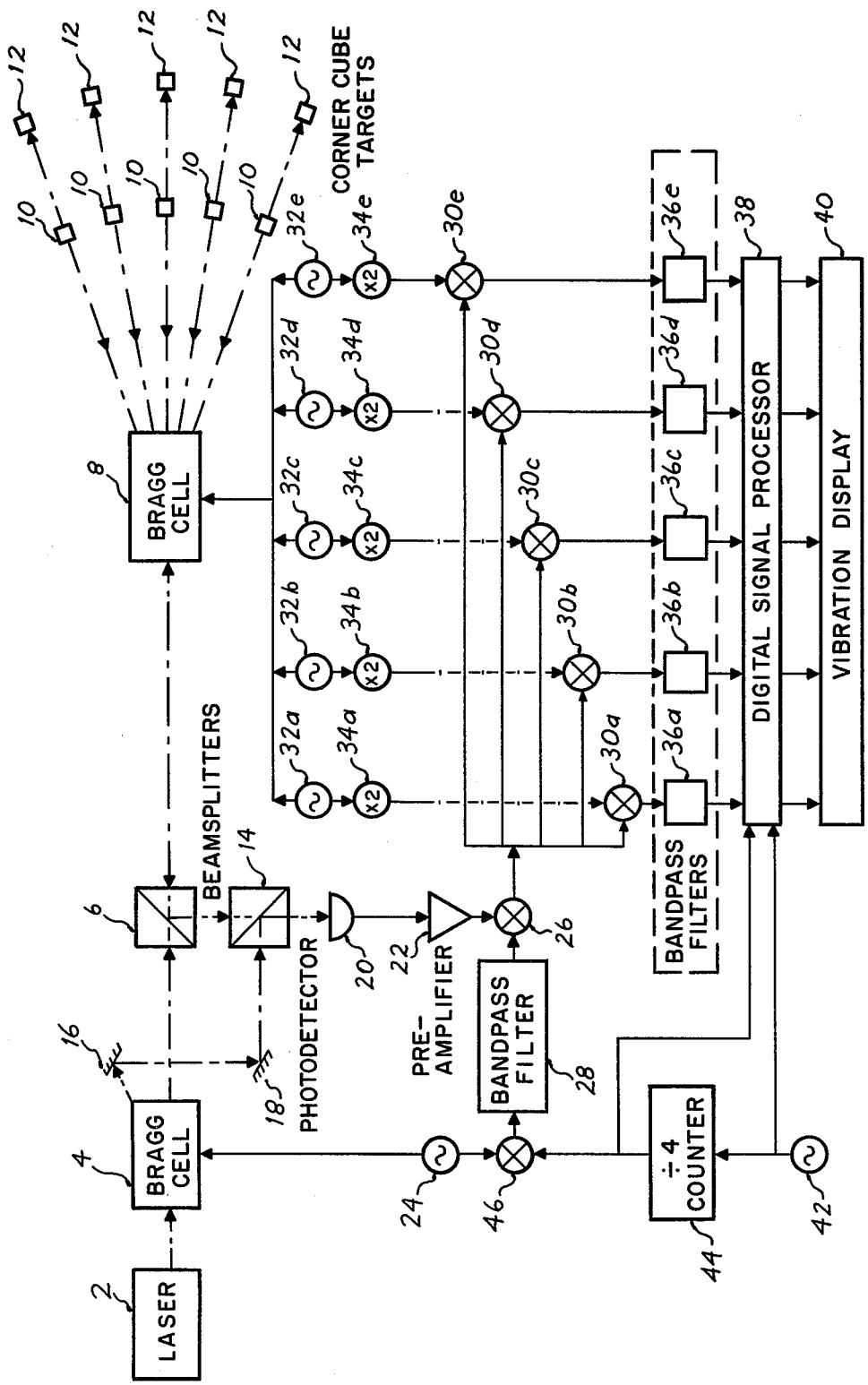

VIBRATION SENSOR

TECHNICAL FIELD

This invention relates to heterodyne methods and apparatus for measuring the distance to a plurality on a surfaces, and in particular changes in the distances, and has one application in the measurement of surface profiles. It also can be utilized in the measurement of surface vibration, displacement, velocity and acceleration.

A form of hetrodyne apparatus has been disclosed in which a single coherent light beam and a single detector is utilized to simultaneously sense the displacement of a number of points on a surface.

BACKGROUND ART

In the prior art of electro-mechanics, accelerometers were used to sense the acceleration of remote targets. Although accelerometers may work satisfactorily at high acceleration rates, they are not accurate at extremely low acceleration rates. Moreover, as the number of measurement points increases, the necessary cables or other data transmission means render the use of accelerometers expensive and unreliable.

Another technique utilized to measure distances to a plurality of points on a surface was to utilize an independent coherent light source and an independent detector for each point to be measured. Another technique was to have a multiplicity of targets and a single coherent light source, which was sequentially aimed at the multiplicity of targets.

The use of an independent coherent light source and an independent detector suffers from high cost and reduced reliability. The sequential measurement technique reduces the cost of a measurement system but still suffers from reduced reliability. Moreover, the sequential measurement technique is slow, and because it can only sense the distance to one point at a time, it cannot accurately measure the distance between two or more points.

DISCLOSURE OF INVENTION

The present invention utilizes a single laser and a single photo detector to simultaneously remotely sense the displacement, velocity and acceleration of a plurality of independent targets. This is accomplished by coding the beam to each target with a different offset frequency. More specifically, the laser system includes a single frequency laser and two Bragg cells. The first Bragg cell splits the laser beam into a reference beam and a target sensing beam. The second Bragg cell electronically splits the target sensing beam into 5 or more beams of different frequency and directs a beam at each target. The return signal from each target is shifted in frequency by an amount proportional to the velocity of that target. These returning beams are recombined by the second Bragg cell.

BRIEF DESCRIPTION OF THE DRAWINGS

The FIGURE is a schematic circuit diagram embodying the invention.

BEST MODE OF CARRYING OUT THE INVENTION

Referring more particularly to FIG. 1 of the drawing, reference numeral 2 indicates a laser such as a HeNe laser. The laser can be a gas laser such as a HeNe laser, a solid state laser such as Nd:Yag laser, a laser diode, or other coherent source which provide the radiation coherence length longer than twide the target range.

The output from laser 2 is fed to first Bragg Cell 4. An output from oscillator 24 is also applied to Bragg Cell 4 so that the output from laser 2 is split into two beams in passing through Bragg cell 4. One of the output beams from Bragg Cell 4 is shifted in frequency from the laser beam output frequency while the other output beam is the same frequency as the laser beam frequency. For convenience, the output frequency from laser 2 will be referred to as $V_o$ and the shifted output frequency will be referred to as $V_o + V_a$, where $V_a$ is the offset frequency.

The shifted output from first Bragg Cell 4 is fed through beamsplitter 6 to a second Bragg Cell 8. Applied across the second Bragg Cell 8 are the outputs of a plurality of RF oscillators 30a through 30e. Each of the RF oscillators 30a through 30e produce a different RF frequency, which, for convenience will be referred to as $V_1$ through $V_5$ to the second Bragg Cell 8 causes the second Bragg Cell to spatially split the shifted beam into a plurality of beams on the same plane but fanned in different directions. Each of the plurality of output beams from the second Bragg Cell 8 has a frequency offset by the frequency from one of the RF oscillators. Each of the outputs from the second Bragg Cell 8 is then expanded in diameter through individual beam expanders 10 in order to reduce the divergence loss to the remote corner cube targets 12.

The beam returning from targets 12, which are frequency shifted by the Doppler frequency and are fed back through the second Bragg Cell 8 to beamsplitter 6, beamsplitter 14 and then to photodetector 20.

The other beam output from the first Bragg Cell 4 is fed via first and second folding mirrors, reference numerals 16 and 18 respectively to beamsplitter 14, and then to photodetector 20 where it is heterodyned with the recombined return signal from targets 12.

The hetrodyned signal is then amplified by preamplifier 22 and fed to RF mixer 26.

For the other signal to RF mixer 26, the output from oscillator 42 is divided by divided-by-four counter 44 and mixed with RF mixer 46 with an output from oscillator 24. The output from RF mixer 46 is filtered by bandpass filter 28 and fed to RF mixer 26.

The output from RF mixer 26 is fed to a plurality of RF mixers designated 30a through 30e. The other inputs to RF mixers 30a through 30e are provided by RF oscillators 32a through 32e via frequency doublers 34a through 34e respectively.

The output from RF mixers 30a through 30e are fed to output bandpass filters 36a through 36e respectively and then to digital signal processor 38.

The digital signal processor 38 utilizes the clock oscillator 42 output and the divided-by-four counter 44 output as reference signals, and the target heterodyne signal after the bandpass filter 36a through 36e to measure the total phase difference between the target signal and the reference signal. A zero-crossing counting technique is used to determine the phase difference between the target signal and the reference signal from divided-by-four counter 44 in a multiple of 360° which corresponds to an on-axis target displacement equal to half of the laser wavelength. The digital signal processor 38 also measures the zero-crossing timing by comparing the target signal and the clock oscillator 42 output. Therefore, a multiple of 90°, which corresponds to an on-axis target displacement one-eighth of the laser wavelength, can be determined. The outputs from the digital signal processor 38 are displayed on display device 40.

In operation, the single frequency output, $V_o$ from laser 2 is fed to the first Bragg Cell 4. The output from the oscillator 24 having frequency $V_a$ is also fed to the first Bragg Cell 4. The first Bragg Cell 4 provides two output beams. One of the output beams has a frequency $V_o$, while the other output has a frequency of $V_o+V_a$, the frequency sum of outputs from the laser 2 and the oscillator 24. The output with the frequency $V_o+V_a$ from the first Bragg Cell 4 is fed through beamsplitter 6 to a second Bragg Cell 8. The second Bragg Cell 8 takes a plurality, in this example, 5, input signals from the oscillators 32a through 32e with frequencies $V_1$ through $V_5$ respectively and spatially fans the input beam in 5 directions. Each output beam from the second Bragg Cell has a different frequency $V_o+V_a+V_j$, where j=1, 2, 3, etc. Each beam is fed through an individual beam expanders 10, to reduce the divergence loss, and then to individual remote corner cube targets 12. The beams returning from corner cube targets 12 are frequency shifted by the Doppler frequency $V_D$ defined by the following:

$$V_D = 2\dot{y}_j/\lambda$$

where $V_D$ = the Doppler freuency shift
$\dot{y}_j$ = the time derivative of the on-axis target displacement
$\lambda$ = the laser wavelength The beams returning from corner cube targets 12 are fed back through the Bragg Cell 8 to beamsplitter 6, beamsplitter 14 and then to photodetector 20. Those return beams are then shifted in frequency by an additional amount $V_j$ and recombined by Bragg Cell 8 to form a single target beam with a frequency of $V_o+V_a+2V_j+2\dot{y}_j/\lambda$. The single target beam is then reflected by beamsplitter 6 and fed through beamsplitter 14 to photodetector 20. Then other beam from the first Bragg Cell 4, having a frequency of $V_o$, is fed via first and second folding mirrors, reference numerals 16 and 18 respectively, to beamsplitter 14, and then to photodetector 20 where it is heterodyned with the recombined return signals from targets 12.

The heterodyne beam frequency between the two beams at the output of the photodetector 20 is $V_a+2V_j+2\dot{y}_j/\lambda$. These outputs from the photodetector 20 after being amplified by preamplifier 22, are mixed by the mixer 26 with the output from the RF mixer 46 being filtered by bandpass filter 28 at frequency $V_a-V_r$. The RF mixer 46 mixes the outputs from the oscillator 24 and the output from the divided-by-four counter 44 having output frequency $V_r$ and in turn from the counter oscillator 42 with output frequency $4V_r$. The output from the RF mixer 26 with frequency $V_r+2V_j+2\dot{y}_j/\lambda$ is fed to RF mixers designated 30a through 30e. The frequency component $2V_j$ is further removed from the mixer 26 output by mixing the frequency doubler 34 output and the RF mixer 26 output and filtering the results with individual bandpass filters 36 (at frequency $V_r$). The frequency doublers 34 take signal from oscillators 32 and output to RF mixers 30 with a frequency equal to twice the input frequency. The filtered output from the bandpass filters 36 (served as channel separation device) having frequency $V_r+2\dot{y}_j/\lambda$ is fed to the digital signal processor 38 along with the other inputs from the counter oscillator 42 with frequency $4V_r$ and the divided-by-four counter 44 with frequency $V_r$ for zero-crossing count comparison.

The time integration of the filter 36 output, or $\int V_r dt + 2/\lambda \int dy$ performed by the digital signal processor 38 is the zero-crossing count of the target-signal. This is compared to the zero-crossing count of the reference signal from the divided-by-four counter 44, or $\int V_r dt$, by the digital signal processor 38. The difference of this comparison is $2/\lambda \int dy$ or the zero-crossing count difference caused by the target displacement. For half of the laser wavelength change in target displacement or $dy = \lambda/2$ implies one count difference. The digital signal processor 38 also measures the zero-crossing timing by comparing the target signal and the clock oscillator 42 output having frequency $4V_r$. Therefore, the displacement measurement is further refined by a factor of four from half of a laser wavelength to one-eighth of a laser wavelength.

Thus it can be seen that the present invention provides a heterodyne apparatus utilizing a laser to simultaneously sample a number of targets. Optical path variations are measured by comparing zero-crossings of the heterodyne signal from each target with those of individual reference signals identified by a specific Bragg frequency.

The structure described herein is presently considered to be preferred; it is contemplated that further variations and modifications within the purview of those skilled in the art can be made herein. For example, pointable relay mirrors could be placed between each pair of expanders 10 and targets 12 if it is desired to place the targets off plane. The following claims are intended to cover all such variations and modifications as fall within the true spirit and scope of the invention.

We claim:

1. Interferometric apparatus for measuring the distance to a plurality of surfaces comprising:

means for providing a coherent light beam at a single frequency $V_o$, means for splitting said coherent light beam into a first and second part and producing a frequency shift of $V_a$ in said first part of said coherent light beam to produce a coherent light beam having a frequency of $V_o+V_a$, coherent light deflection means for receiving one part of the split coherent light beam, a plurality of RF signal generating means, said plurality of RF signal generating means operably connected to said coherent light deflection means to cause said coherent light deflection means to fan said one part of the split coherent light beam into a plurality of coherent light beams, means for expanding and reflecting back each of said plurality of coherent light beams to said light deflection means, said light deflection means recombining said plurality of coherent light beams, photosensitive detective means for receiving said recombined coherent light beam, said photosensitive detective means also receiving the other part of said split coherent light beam for heterodyning with said recombined coherent light beam to produce a heterodyned signal, means for mixing said heterodyned signal with an output from each of said plurality of RF signal generating means, means for deriving from said mixing means a plurality of signals whereof the phase of each of said signals is a measure of the distance to said plurality of targets.

2. Apparatus as claimed in claim 1 wherein said coherent light beam splitting means comprises a first Bragg Cell and an oscillator, said first Bragg Cell being arranged to receive a signal from said oscillator and said coherent light beam.

3. Apparatus as claimed in claim 1 wherein said coherent light deflection means comprises second Bragg Cell.

4. Apparatus as claimed in claim 3 wherein said means for expanding and reflecting back each of said plurality of coherent light beams comprises a beam expander means and a corner cube target means.

5. Apparatus as claimed in claim 3 wherein said part of the split coherent light beam comprises said first part of said coherent light beam having a frequency of $V_o + V_a$.

6. Apparatus as claimed in claim 5 wherein said means for expanding and reflecting back each of said plurality of coherent light beams include a beam expander means and a corner cube target means.

* * * * *